May 22, 1945.  J. E. SHEPHERD  2,376,392
PHASE SHIFTER
Filed Feb. 23, 1943
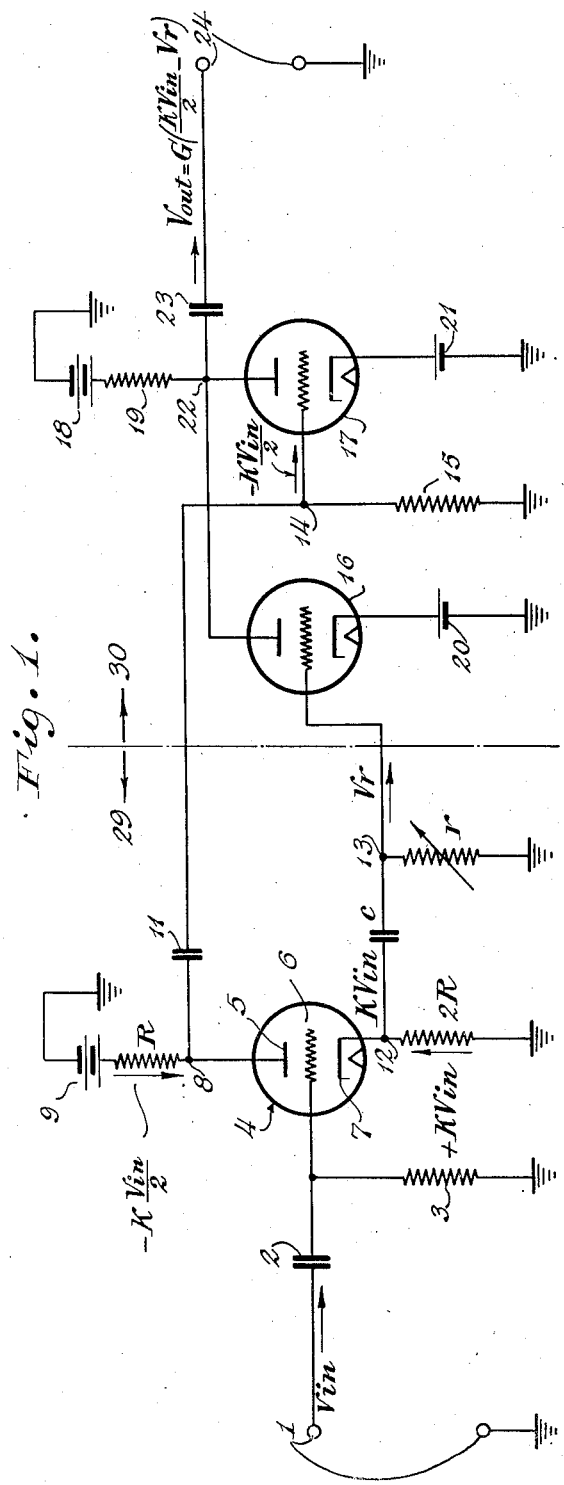
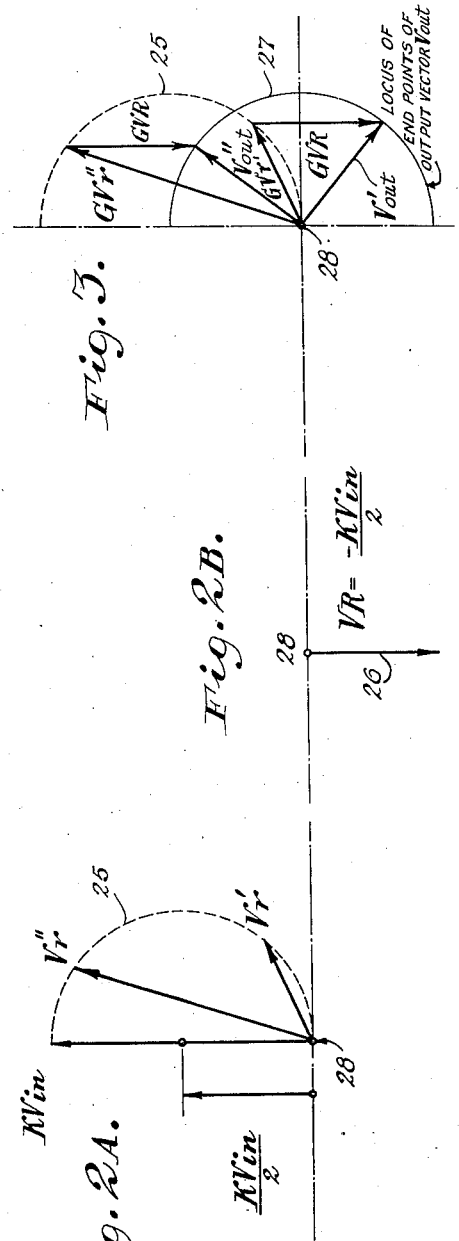
INVENTOR
James E. Shepherd
BY
ATTORNEY Patented May 22, 1945

2,376,392

UNITED STATES PATENT OFFICE 2,376,392

PHASE SHIFTER

James E. Shepherd, Hempstead, N. Y., assignor to Sperry Gyroscope Company, Inc., Brooklyn, N. Y., a corporation of New York Application February 23, 1943, Serial No. 476,865

4 Claims. (Cl. 172—238)

This invention relates to phase shifters and more specifically, to electronic phase shifters.

As is well known in the art, particularly in the field of radio, phase shifters are used extensively for timing purposes and for the purpose of measuring the phase between some voltage and that of a known reference voltage.

While there are many methods for shifting phase, the requirements of certain specific uses restrict the available methods applicable to these requirements to a limited field.

Where it is desirable to vary the phase over a wide range under the condition that the amplitude shall not vary with the phase shift, the method has been, for all practical purposes, limited to the well-known split transformer, resistive capacitive circuit, which provides for a phase shift substantially variable over 180° and delivers a voltage which is proportional to the radius of the familiar resistance-capacitance circle diagram.

In use, this particular apparatus possesses certain inherent characteristics which are highly objectionable under certain conditions and applications. When used in connection with a cathode ray oscilloscope, the transformer is subject to interferences which are projected on the screen as a part of the signal making the latter visible as a wide, fuzzy, beam, and thereby preventing accurate measurements from being made. Further, the reflection of the variable resistive capacitive impedance into the transformer primary produces a variable loading on the source. At high frequency the capacitive element will resonate with the leakage impedance, and at low frequencies core saturation becomes objectionable. Also, at low frequencies the input impedance of the transformer is very low.

Accordingly, it is the primary object of my invention to provide apparatus for phase-shifting purposes which will produce phase changes over a wide range with no appreciable effect on the amplitude of the output voltage and at the same time obviate the above-enumerated objectionable characteristics of a particular phase-shifting apparatus.

Another object of my invention is to provide an electronic phase-shifting device comprising an input control branch and a summation branch which will deliver an output of variable phase and substantially constant amplitude.

Another object of my invention is to provide a phase-shifting apparatus which utilizes electronic means for voltage division and voltage component summation purposes.

A further object of my invention is to provide apparatus of simple construction economically producible and operatively efficient which will accomplish the above-stated objects of invention.

In carrying out the objects of my invention, I provide in a preferred embodiment thereof, a circuit which for the sake of description may be considered to consist of two functional branches, namely, an input control branch 29, Fig. 1, and a summation branch 30. In the former I employ a phase-splitting circuit which supplies two components of voltage, one to the phase-shifting elements and one to the summation branch. It also performs the function of a unilateral transducer. As a unilateral transducer, this element of the circuit prevents loading of the source, and looking into the input terminals from the source, provides a high, non-variable impedance. Looking into the cathode of the phase-splitting element, it provides a low impedance source in order to supply a fixed voltage to the phase-shifting elements of the branch. The plate circuit of this phase-splitting element supplies a fixed voltage to the summation branch which is opposite in phase and equal to one half of the magnitude of the voltage supplied to the phase-shifting elements.

In the summation branch which acts as a phase translating circuit two electronic control elements are utilized, the respective grids of which receive the component voltages of the phase-splitting branch, one directly from the anode of the phase-splitting element and the other from the phase-shifting elements. The anodes of these discharge devices are connected in parallel through a load resistor to a positive source of electrical energy, and the cathodes are grounded through bias circuits, or may be connected directly to ground. The anode load circuit of the summation branch delivers an output which is variable in phase and substantially constant in amplitude corresponding to variations in either of the phase-shifting parameters.

These and other objects of the invention will become apparent from the following detailed description when taken in connection with the accompanying drawing, in which like reference numerals are used throughout to designate like parts and in which:

Fig. 1 is a circuit diagram showing an embodiment of my invention,

Fig. 2A is a circle diagram showing the relation of the voltage across the variable resistor of the phase-shifting elements, Fig. 2B is a vector representation of the voltage across the resistance R with respect to $KV_{in}$, and Fig. 3 is a circle diagram showing the output voltage of the summation branch.

With reference to Fig. 1, it will be noted that I employ in the input control branch as a divisional voltage means an electronic element 4, which may be of the triode type, the anode 5 of which is connected through the resistance R to positive electrical energy source 9 and the cathode 7 of which is connected through the resistance 2R and which may be grounded as shown. An input voltage $V_{in}$ is impressed on the circuit at the input terminals 1 and is applied to the grid 6 of tube 4 through a coupling circuit consisting of the capacitance 2 and the resistance 3. The tube 4 is connected to operate as a phase-inverting unit and also as a cathode follower. One component of the output is taken from the terminal point 8 through the capacitance 11 to the summation circuit hereinafter to be described. The other component of the voltage is taken from the terminal 12 through the phase-shifting parameters comprising the capacitance $c$ and variable impedance coupling resistor $r$. Voltage across the variable resistor, designated $V_r$, is taken from the phase-shifting circuit at the terminal 13 and conducted to the grid of the tube 16 which forms one of the elements of the summation branch, tube 17 forming the other member thereof. Voltage received from the terminal 8 of the phase-splitting element 4 is applied to the grid of tube 17 through the substantially constant impedance coupling elements 11 and 15. Since the reactance of capacitor 11 is small compared with the resistance of resistor 15, the voltage at terminal 14 is substantially identical in both phase and magnitude to that at terminal 8. The cathodes of the tubes 16 and 17, which may be of the triode or pentode type, are grounded through the bias circuits 20 and 21. The anodes of the tubes 16 and 17 are connected in parallel to positive electrical energy source 18 through the resistor 19. The output of the summation branch is taken from the terminal 22 through the capacitor 23 to the output terminals 24.

The voltages and voltage paths of the circuit are indicated in Fig. 1 by the directional arrows and voltage designations. As indicated, the input voltage divides at the voltage-splitting element 4 into two components designated as $$\frac{-KV_{in}}{2}$$

and $KV_{in}$. It is to be noted that the rigor with which this division of the input voltage is obtained depends on the value of reactance of $c$ with respect to the resistance 2R. Here the reactance of the capacitance $c$ is large in comparison with the cathode resistor 2R. Therefore, the voltage across the phase-shifting combination is equal to $KV_{in}$ and the plate voltage is equal to $$\frac{-KV_{in}}{2}$$

where K is less than unity and a function of the tube transconductance, plate resistance, and cathode resistor 2R.

The components $V_r$ and $$\frac{-KV_{in}}{2}$$

as shown by the directional arrows, are impressed upon the summation circuit where they are combined, inverted, and amplified, and delivered therefrom as a composite voltage ($V_{out}$) equal to $$G\left(\frac{KV_{in}}{2} - V_r\right)$$

where G is the gain of the summation stage of the phase-translating branch.

The functions of the circuit shown in Fig. 1 with respect to the various voltage manipulations are represented vectorially in Figs. 2A, 2B and 3. Figs. 2A and 2B represent the input voltages to the summation branch, and Fig. 3 the output voltage of the same.

In Fig. 2A, circle 25 is the locus of end points of the vector $V_r$ as either $c$ or $r$ is varied. The other end of the vector $V_r$ is, in each case, point 28 which represents the potential of the ground bus in Fig. 1. When the vector $$\frac{-KV_n}{2}$$

26 in Fig. 2B, is combined with each vector $V'_r$, $V''_r$ and so forth, a new circular locus 27 is formed as shown in Fig. 3. Vectors which join the ground point 28 with points on the circular locus represent alternating voltages measured across the output load resistor 19 of the summation elements 16 and 17. Hence, these vectors also represent voltages $V'_{out}$, $V''_{out}$ and so forth, as measured between the output terminals 24 as either $r$ or $c$ is varied between the limits of zero and infinity. In a sense, therefore, and with respect to two vector voltages, the circuit may be considered as containing an electronic tube 4 which produces a first and second vector voltage, one of which remains substantially constant both in magnitude and in direction, and the other of which is variable both in magnitude and direction. Through the action of the grid coupling elements of device 16, the magnitude and direction of this latter vector voltage is variable. Within the summation branch of the circuit which comprises the elements 16 and 17, both of these vector voltages are combined to produce a third vector voltage whose magnitude is substantially constant but whose direction is variably determined by variations in the variable resistive element of the grid coupling of electronic discharge device 16.

As will be apparent to one skilled in the art, many modifications are possible to the above described circuit. In some cases it may be desirable to separate the two functions of the input tube. For example, voltage component $$\frac{-KV_n}{2}$$

may be obtained from a separate phase-inverting element having an amplification of one half and fed from the point 12. In such case, circle 27, Fig. 3, will then not be distorted due to the variable loading of the phase-shifting elements on the cathode 7 of the input element 4.

I have also shown the electronic control elements of the summation branch 16 and 17 to be of the triode type. It is understood that they may be replaced by tubes of the pentode type, and if such substitution is made, the resistance 19 can be made larger with the result that the amplification of the summation branch will be large. However, as shown, that is with the use of triode tubes, it is preferable that the resistance 19 be very small with respect to the plate resistances of the tubes 16 and 17, in order that there be no inter-action between them.

It is also to be understood that the phase-shifting elements $c$ and $r$ may be interchanged at will and either of these parameters varied to produce the desired phase-shifting result. The vectors forming the locus 25 of Fig. 2A would then be the voltages across $c$ rather than across $r$, and the sense of the vector rotation would be reversed.

Similarly, the voltage summation may be accomplished by other means. If inversion in the summation stage is not desired, summation can be accomplished in a common cathode circuit of elements 16 and 17 with due regard to impedance requirements.

Since these and other modifications of the invention are possible and may suggest themselves in view of the foregoing disclosures, the spirit and scope of my invention are to be limited only by the appended claims.

What is claimed is:

1. In combination, a voltage dividing stage, first and second connecting means for respectively receiving a first and second voltage component of said voltage dividing stage, a dual grid controlled electronic summation stage, the grids of which are connected to said first and second connecting means, and a variable phase-shifting means connected in said second connecting means, said dual summation stage being operable to combine said first voltage component and the variably phase-shifted second voltage component to deliver an output voltage of constant magnitude and of variable phase corresponding to the variations of said variable phase-shifting means.

2. In a phase-shifting device, divisional voltage output means for producing two components of alternating voltage, the first component of which is opposite in phase and equal to one-half the magnitude of the second component, summation means for combining portions of the output components of said divisional voltage means, and means including a phase-shifting circuit for conducting a portion of the said second component of said divisional voltage means to said summation means whereby said summation means is conditioned to deliver an output voltage variable in phase and substantially constant in magnitude.

3. In a phase shifting apparatus, means for providing a first alternating output voltage and a second alternating output voltage of opposite phase and substantially double the amplitude of said first voltage, means responsive to said first voltage for producing a first current of substantially fixed amplitude and phase relation therewith, means responsive to said second alternating voltage for producing a further alternating voltage of amplitude and phase variable in a predetermined manner with respect to said second output voltage, means for producing a second current varying in phase and amplitude according to the phase and amplitude of said further voltage, and common impedance means connected to said first and second current-producing means to conduct both of said currents for producing a voltage varying in phase according to the vector sum of said first voltage and said further voltage.

4. Apparatus for shifting the phase of an alternating voltage without appreciable change of amplitude of the voltage, comprising an electronic phase inverter having a grid input circuit adapted to receive an alternating input voltage, a cathode output resistor and an anode output resistor of one-half the resistance of said cathode resistor; dual electron discharge devices each including an anode, a cathode, and a control grid; fixed impedance means coupling said anode load resistor to the control grid of one of said electron discharge devices for applying thereto a fixed version of the phase inverter output voltage produced across said anode output resistor; variable impedance means coupling said cathode load resistor to the control grid of the other of said electron discharge devices for applying thereto a variable amplitude, variable phase version of the phase inverter output voltage produced across said cathode output resistor; and common anode-current-conducting impedance means connected to said dual electron discharge devices for producing a voltage varying in accordance with the vector sum of the voltage versions applied to the grids of said dual electron discharge devices.

JAMES E. SHEPHERD.